(12) United States Patent
Thakur et al.

(10) Patent No.: US 12,158,046 B2
(45) Date of Patent: Dec. 3, 2024

(54) MAINTAINING TORQUE WRENCHES USING A PREDICTIVE MODEL

(71) Applicant: Schlumberger Technology Corporation, Sugar Land, TX (US)

(72) Inventors: Palaque Thakur, Houston, TX (US); Sven Brinkmann, Houston, TX (US)

(73) Assignee: SCHLUMBERGER TECHNOLOGY CORPORATION, Sugar Land, TX (US)

( * ) Notice: Subject to any disclaimer, the term of this patent is extended or adjusted under 35 U.S.C. 154(b) by 292 days.

(21) Appl. No.: 16/907,537

(22) Filed: Jun. 22, 2020

(65) Prior Publication Data

US 2021/0397154 A1   Dec. 23, 2021

(51) Int. Cl.
*E21B 19/16* (2006.01)
*G05B 19/4065* (2006.01)
*G06N 5/02* (2023.01)

(52) U.S. Cl.
CPC .......... *E21B 19/161* (2013.01); *E21B 19/166* (2013.01); *G05B 19/4065* (2013.01); *G06N 5/02* (2013.01); *E21B 2200/20* (2020.05); *G05B 2219/37252* (2013.01)

(58) Field of Classification Search
CPC ...... E21B 19/16; E21B 19/161; E21B 19/165; E21B 19/166; E21B 2200/20; G05B 19/4065; G05B 2219/37252; G06N 5/02
See application file for complete search history.

(56) References Cited

U.S. PATENT DOCUMENTS

| | | | |
|---|---|---|---|
| 4,471,841 A * | 9/1984 | Rector, Jr. | E21B 34/06 251/324 |
| 5,745,049 A | 4/1998 | Akiyama et al. | |
| 6,898,968 B2 | 5/2005 | Biester et al. | |
| 6,941,244 B1 | 9/2005 | Saito et al. | |
| 7,062,960 B2 | 6/2006 | Couren et al. | |
| 7,099,649 B2 | 8/2006 | Patterson et al. | |
| 7,143,007 B2 | 11/2006 | Long et al. | |
| 7,274,989 B2 | 9/2007 | Hopper | |
| 7,302,842 B2 | 12/2007 | Biester et al. | |
| 7,880,634 B2 | 2/2011 | Fuller et al. | |

(Continued)

FOREIGN PATENT DOCUMENTS

WO   2016010779 A1   1/2016
WO   2016026680 A1   2/2016

(Continued)

*Primary Examiner* — Christopher J Sebesta
(74) *Attorney, Agent, or Firm* — Kelly McKinney

(57) ABSTRACT

A method includes generating a model for predicting a remaining service life of a gripping member of a torque wrench based in part on a number of connections of one or more types of tubulars that are made or broken using the torque wrench before slippage of the torque wrench occurs, counting a first number of connections of a first type of tubular that are made using the torque wrench, predicting, using the model, the remaining service life of the gripping member of the torque wrench based in part on the first number of connections of the first type of tubular that were made using the torque wrench, and performing maintenance on the torque wrench based on the remaining service life of the gripping member of the torque wrench that is predicted, before slippage of the torque wrench occurs.

18 Claims, 6 Drawing Sheets

(56) References Cited

U.S. PATENT DOCUMENTS

| | | |
|---|---|---|
| 7,925,472 B2 | 4/2011 | Nasr et al. |
| 8,112,521 B2 | 2/2012 | Barnett et al. |
| 8,134,474 B2 | 3/2012 | Fuller et al. |
| 8,204,697 B2 | 6/2012 | Garvey et al. |
| 8,216,517 B2 | 7/2012 | Prasad et al. |
| 8,347,957 B2 | 1/2013 | Stephenson et al. |
| 8,423,397 B2 | 4/2013 | Sitton |
| 8,490,705 B2 | 7/2013 | Curtiss, III |
| 8,503,190 B2 | 8/2013 | Tart et al. |
| 8,554,717 B2 | 10/2013 | Reckmann et al. |
| 8,560,096 B1 | 10/2013 | Chapman et al. |
| 8,560,097 B1 | 10/2013 | Chapman et al. |
| 8,560,098 B1 | 10/2013 | Chapman et al. |
| 8,583,597 B2 | 11/2013 | Atamna et al. |
| 8,676,721 B2 | 3/2014 | Piovesan et al. |
| 8,761,910 B1 | 6/2014 | Chapman, Jr. et al. |
| 8,761,911 B1 | 6/2014 | Chapman et al. |
| 8,761,912 B1 | 6/2014 | Chapman, Jr. et al. |
| 8,781,743 B2 | 7/2014 | Mckay et al. |
| 8,819,652 B2 | 8/2014 | Zingelewicz et al. |
| 8,825,567 B2 | 9/2014 | Jiang et al. |
| 8,898,525 B2 | 11/2014 | Loganathan et al. |
| 8,978,699 B2 | 3/2015 | Jaffrey et al. |
| 9,053,468 B2 | 6/2015 | Haynes et al. |
| 9,110,452 B2 | 8/2015 | Blevins et al. |
| 9,163,471 B2 | 10/2015 | Coonrod et al. |
| 9,187,974 B2 | 11/2015 | Coonrod et al. |
| 9,410,392 B2 | 8/2016 | Jaffrey et al. |
| 9,546,545 B2 | 1/2017 | Cardellini et al. |
| 9,633,067 B2 | 4/2017 | Maddock |
| 9,634,581 B2 | 4/2017 | Jaffrey |
| 9,658,130 B2 | 5/2017 | Veeningen |
| 9,677,573 B2 | 6/2017 | Jaffrey |
| 9,732,879 B2 | 8/2017 | Jaffrey |
| 9,804,039 B2 | 10/2017 | Reyes, III et al. |
| 9,934,479 B2 | 4/2018 | Sanchez et al. |
| 9,964,135 B2 | 5/2018 | Jaffrey et al. |
| 9,970,569 B2 | 5/2018 | Kotrla et al. |
| 9,988,870 B2 | 6/2018 | Gray |
| 10,087,745 B2 | 10/2018 | Gottlieb et al. |
| 10,151,160 B2 | 12/2018 | Jaffrey et al. |
| 10,161,225 B2 | 12/2018 | Jaffrey et al. |
| 10,175,287 B2 | 1/2019 | Jaffrey et al. |
| 10,215,009 B2 | 2/2019 | Tjostheim et al. |
| 10,221,674 B2 | 3/2019 | Samuel |
| 10,246,994 B2 | 4/2019 | Jaffrey |
| 10,248,141 B2 | 4/2019 | McKeon et al. |
| 10,256,676 B2 | 4/2019 | Gray |
| 10,273,774 B2 | 4/2019 | Jaffrey |
| 10,287,869 B2 | 5/2019 | Jaffrey |
| 10,329,875 B2 | 6/2019 | Reyes, III et al. |
| 10,392,924 B2 | 8/2019 | Gray |
| 10,408,641 B2 | 9/2019 | Gaude |
| 10,502,021 B2 | 12/2019 | Healy |
| 10,570,689 B2 | 2/2020 | Jaffrey |
| 10,648,317 B2 | 5/2020 | Dykstra et al. |
| 10,685,335 B2 | 6/2020 | Buca et al. |
| 10,769,323 B2 | 9/2020 | Camacho Cardenas |
| 2013/0255446 A1* | 10/2013 | Taggart ................ E21B 19/164 |
| | | 81/57.11 |
| 2014/0074260 A1 | 3/2014 | Schroeder et al. |
| 2014/0182381 A1 | 7/2014 | Comeaux et al. |
| 2014/0231075 A1 | 8/2014 | Springett et al. |
| 2015/0022326 A1 | 1/2015 | Baxter et al. |
| 2015/0294048 A1 | 10/2015 | Jones |
| 2016/0131692 A1 | 5/2016 | Jaffrey |
| 2016/0168979 A1 | 6/2016 | Zhang et al. |
| 2016/0179751 A1 | 6/2016 | Korjani et al. |
| 2016/0186516 A1 | 6/2016 | Jaffrey |
| 2016/0217379 A1 | 7/2016 | Patri et al. |
| 2016/0237773 A1 | 8/2016 | Dalton et al. |
| 2016/0274551 A1 | 9/2016 | Mishra et al. |
| 2016/0292652 A1 | 10/2016 | Bowden, Jr. et al. |
| 2016/0371957 A1 | 12/2016 | Ghaffari et al. |
| 2017/0074067 A1 | 3/2017 | Jaffrey et al. |
| 2017/0268323 A1 | 9/2017 | Dykstra et al. |
| 2018/0142543 A1 | 5/2018 | Gupta et al. |
| 2018/0363421 A1 | 12/2018 | Harshbarger et al. |
| 2019/0119997 A1* | 4/2019 | Helms ................... E21B 19/164 |
| 2019/0120023 A1 | 4/2019 | Ocegueda-Hernandez et al. |
| 2019/0264545 A1 | 8/2019 | Camacho Cardenas et al. |
| 2020/0003611 A1 | 1/2020 | Turner et al. |
| 2020/0123878 A1 | 4/2020 | Yepez |
| 2020/0277826 A1* | 9/2020 | Mccorriston ......... E21B 19/163 |

FOREIGN PATENT DOCUMENTS

| WO | WO-2019074712 A2 * | 4/2019 | ............ E21B 41/00 |
|---|---|---|---|
| WO | 2020018492 A1 | 1/2020 | |

* cited by examiner

MAINTAINING TORQUE WRENCHES USING A PREDICTIVE MODEL

BACKGROUND

Torque wrenches are employed as part of iron roughnecks or top drives in drilling rigs to connect together (make-up) and disconnect (break-out) tubulars. For example, a torque wrench can be used to apply torque to an add-on drill pipe or stand of two or more drill pipes, so as to connect the lower end of the add-on drill pipe to the upper end of a drill string. Conversely, when removing pipe from the wellbore, the drill string can be incrementally disassembled using the torque wrench to reverse out the threaded connections. The same process can be used for many different types of tubulars that are deployed into a wellbore (e.g., casing, liner, etc.).

Torque wrenches generally include replaceable dies to form a high-friction engagement with the outer diameter of the tubular. The torque is then transmitted to the tubular via the dies, which causes the tubular to spin relative the tubular string. The dies are consumable, however, as the engagement with the tubulars causes them to wear. Accordingly, rig operators switch out the dies at regular intervals, or after the dies no longer work satisfactorily, as part of regular maintenance of the torque wrenches.

Rigs are generally rented, and rig time can be quite expensive. Accordingly, taking the torque wrench out of operation to perform such maintenance while the rest of the rig is ready for operation increases rig non-productive time and increases the costs of drilling and/or completing a well.

SUMMARY

Embodiments of the disclosure provide a method that includes generating a model for predicting a remaining service life of a gripping member of a torque wrench based in part on a number of connections of one or more types of tubulars that are made or broken using the torque wrench before slippage of the torque wrench occurs, counting a first number of connections of a first type of tubular that are made using the torque wrench, predicting, using the model, the remaining service life of the gripping member of the torque wrench based in part on the first number of connections of the first type of tubular that were made using the torque wrench, and performing maintenance on the torque wrench based on the remaining service life of the gripping member of the torque wrench that is predicted, before slippage of the torque wrench occurs.

Embodiments of the disclosure also provide a torque wrench system including a torque wrench configured to rotate a tubular into connection with another tubular. The torque wrench includes a gripping member configured to transmit torque to the tubular. The system also includes a sensor coupled to the torque wrench and configured to measure torque applied to the tubular, one or more processors in communication with the sensor, and a memory system including one or more non-transitory computer-readable media storing instructions that, when executed by at least one of the one or more processors, are configured to cause the torque wrench system to perform operations. The operations include generating a model for predicting a remaining service life of the gripping member of the torque wrench based in part on a number of connections of one or more types of tubulars that are made or broken using the torque wrench before slippage of the torque wrench occurs, counting a first number of connections of a first type of tubular that are made using the torque wrench, predicting, using the model, the remaining service life of the gripping member of the torque wrench based in part on the first number of connections of the first type of tubular that were made using the torque wrench, and scheduling maintenance on the torque wrench based on the remaining service life of the gripping member of the torque wrench that is predicted, before slippage of the torque wrench occurs.

Embodiments of the disclosure further provide a computer system including one or more processors, and a non-transitory computer-readable medium storing instructions that, when executed by at least one of the one or more processors, is configured to cause the torque wrench system to perform operations. The operations include generating a model for predicting a remaining service life of a gripping member of a torque wrench based in part on a number of connections of one or more types of tubulars that are made or broken using the torque wrench before slippage of the torque wrench occurs, counting a first number of connections of a first type of tubular that are made using the torque wrench, predicting, using the model, the remaining service life of the gripping member of the torque wrench based in part on the first number of connections of the first type of tubular that were made using the torque wrench, and scheduling maintenance on the torque wrench based on the remaining service life of the gripping member of the torque wrench that is predicted, before slippage of the torque wrench occurs.

This summary is provided to introduce a selection of concepts that are further described below in the detailed description. This summary is not intended to identify key or essential features of the claimed subject matter, nor is it intended to be used as an aid in limiting the scope of the claimed subject matter.

BRIEF DESCRIPTION OF THE DRAWINGS

The accompanying drawings, which are incorporated in and constitute a part of this specification, illustrate embodiments of the present teachings and together with the description, serve to explain the principles of the present teachings. In the figures.

DETAILED DESCRIPTION

Reference will now be made in detail to embodiments, examples of which are illustrated in the accompanying drawings and figures. In the following detailed description, numerous specific details are set forth in order to provide a thorough understanding of the invention. However, it will be apparent to one of ordinary skill in the art that the invention may be practiced without these specific details. In other instances, well-known methods, procedures, components, circuits, and networks have not been described in detail so as not to unnecessarily obscure aspects of the embodiments.

It will also be understood that, although the terms first, second, etc. may be used herein to describe various elements, these terms are used to distinguish one element from another and do not imply that any one of these elements is a requirement for another to be present (e.g., a second element can be present without the first element). More particularly, a first object or action could be termed a second object or action, and, similarly, a second object or action could be termed a first object or action, without departing from the scope of the present disclosure. The first object or action, and the second object or action, are both, objects or actions, respectively, but they are not to be considered the same object or action.

The terminology used in the description herein is for the purpose of describing particular embodiments and is not intended to be limiting. As used in this description and the appended claims, the singular forms "a," "an" and "the" are intended to include the plural forms as well, unless the context clearly indicates otherwise. It will also be understood that the term "and/or" as used herein refers to and encompasses any possible combinations of one or more of the associated listed items. It will be further understood that the terms "includes," "including," "comprises" and/or "comprising," when used in this specification, specify the presence of stated features, integers, steps, operations, elements, and/or components, but do not preclude the presence or addition of one or more other features, integers, steps, operations, elements, components, and/or groups thereof. Further, as used herein, the term "if" may be construed to mean "when" or "upon" or "in response to determining" or "in response to detecting," depending on the context.

Further, as used herein, the terms "inner" and "outer"; "up" and "down"; "upper" and "lower"; "upward" and "downward"; "upstream" and "downstream"; "above" and "below"; "inward" and "outward"; and other like terms as used herein refer to relative positions to one another and are not intended to denote a particular direction or spatial orientation. The terms "couple," "coupled," "connect," "connection," "connected," "in connection with," and "connecting" refer to "in direct connection with" or "in connection with via one or more intermediate elements or members."

Figure 1:
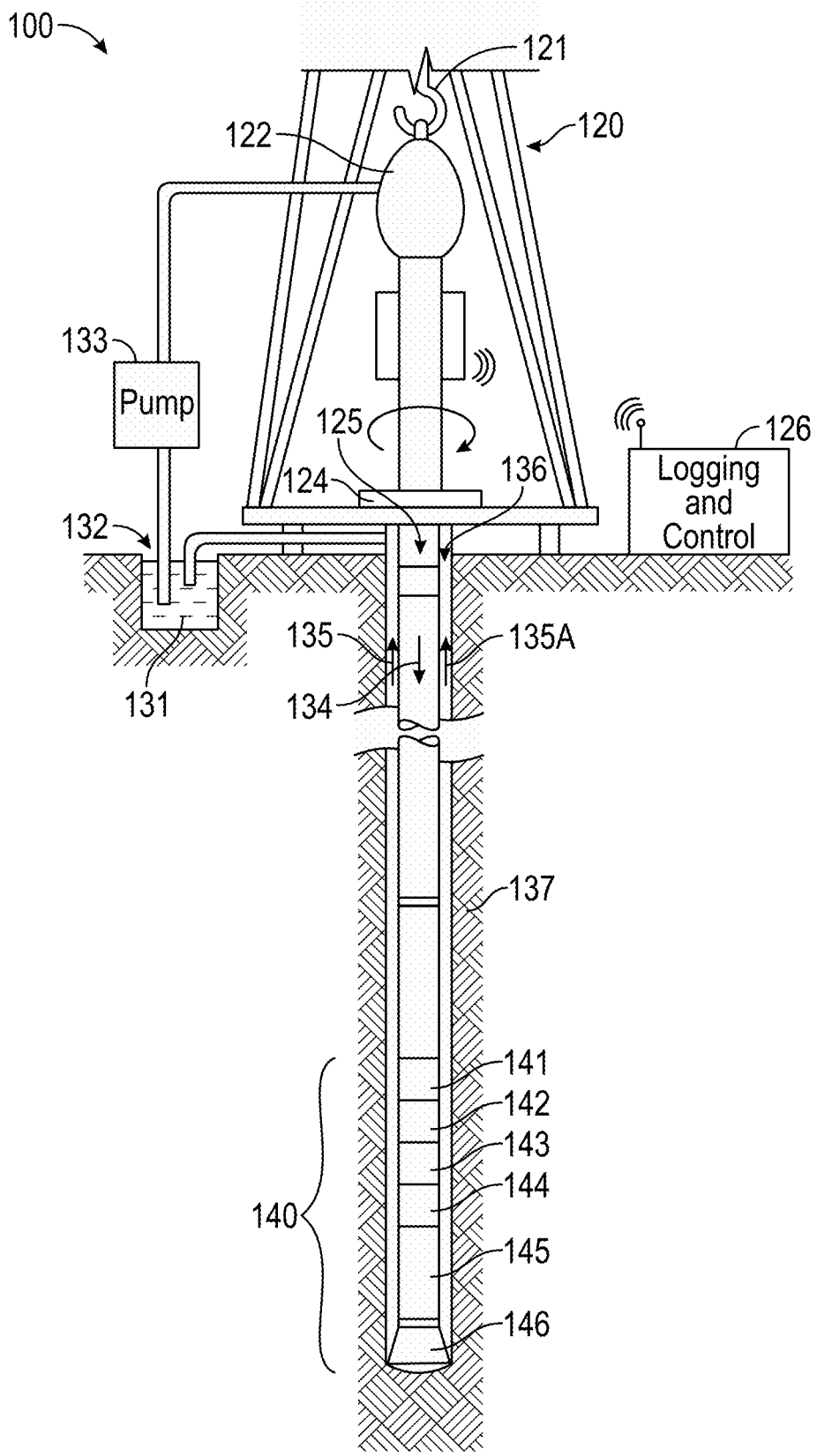
FIG. 1 illustrates a schematic view of a wellsite system, according to an embodiment.

FIG. 1 illustrates a wellsite system, which may implement various aspects of the present disclosure, according to an embodiment. The wellsite can be onshore or offshore. In this example system, a borehole is formed in subsurface formations by rotary drilling in a manner that is well known. A drill string 125 is suspended within a borehole 136 and has a bottom hole assembly (BHA) 140 which includes a drill bit 146 at its lower end. A surface system 120 includes platform and derrick assembly positioned over the borehole 136, the assembly including a rotary table 124, kelly (not shown), hook 121, and rotary swivel 122. The drill string 125 is rotated by the rotary table 124 energized by one or more devices not shown, which engages the kelly (not shown) at the upper end of the drill string 125. The drill string 125 is suspended from the hook 121, attached to a traveling block (also not shown), through the kelly (not shown) and the rotary swivel 122 which permits rotation of the drill string 125 relative to the hook 121. In other embodiments, a top drive system could be used instead of the rotary table system shown in FIG. 1.

In the illustrated example, the surface system 120 further includes drilling fluid or mud 132 stored in a pit 131 formed at the well site. A pump 133 delivers the drilling fluid to the interior of the drill string 125 via a port (not shown) in the swivel 122, causing the drilling fluid to flow downwardly through the drill string 125 as indicated by the directional arrow 134. The drilling fluid exits the drill string via ports (not shown) in the drill bit 146, and then circulates upwardly through an annulus region between the outside of the drill string 125 and the wall of the borehole 137, as indicated by the directional arrows 135 and 135A. In this manner, the drilling fluid lubricates the drill bit 146 and carries formation cuttings up to the surface as it is returned to the pit 131 for recirculation.

The BHA 140 of the illustrated embodiment may include a measuring-while-drilling (MWD) tool 141, a logging-while-drilling (LWD) tool 144, a rotary steerable directional drilling system 145 and motor, and the drill bit 146. It will also be understood that more than one LWD tool and/or MWD tool can be employed, e.g. as represented at 143.

The LWD tool 144 is housed in a special type of drill collar and can contain one or a plurality of known types of logging tools. The LWD tool 144 may include capabilities for measuring, processing, and storing information, as well as for communicating with the surface equipment. In the present example, the LWD tool 144 may include any one or more well logging instruments known in the art, including, without limitation, electrical resistivity, acoustic velocity or slowness, neutron porosity, gamma-gamma density, neutron activation spectroscopy, nuclear magnetic resonance and natural gamma emission spectroscopy.

The MWD tool 141 is also housed in a special type of drill collar, as is known in the art, and can contain one or more devices for measuring characteristics of the drill string and drill bit. The MWD tool 141 further includes an apparatus 142 for generating electrical power to the downhole system. This may typically include a mud turbine generator powered by the flow of the drilling fluid, it being understood that other power and/or battery systems may be employed. In the present embodiment, the MWD tool 141 may include one or more of the following types of measuring devices: a weight-on-bit measuring device, a torque measuring device, a vibration measuring device, a shock measuring device, a stick slip measuring device, a direction measuring device, and an inclination measuring device. The power generating apparatus 142 may also include a drilling fluid flow modulator for communicating measurement and/or tool condition signals to the surface for detection and interpretation by a logging and control unit 126.

Figure 2:
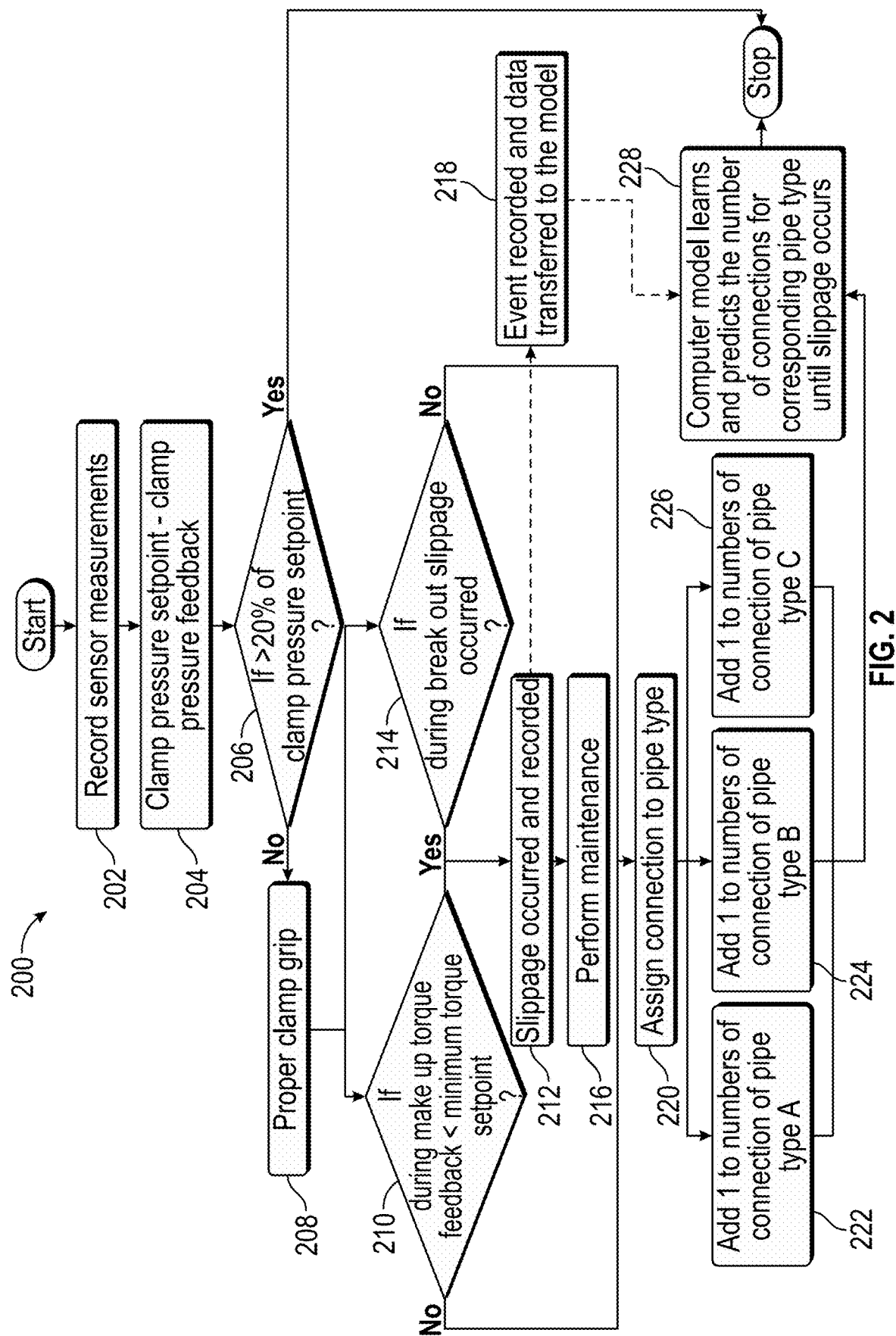
FIG. 2 illustrates a flowchart of a method for training a predictive model that can be used for scheduling maintenance of a torque wrench, according to an embodiment.

FIG. 2 illustrates a flowchart of a method 200 for training a predictive model that can be used for scheduling maintenance of a torque wrench, according to an embodiment. The torque wrench may include dies or other gripping members, as will be described in greater detail below. The torque wrench may also include sensors configured to measure clamping pressure and/or torque applied to the tubular by the torque wrench.

The method 200 may thus begin by recording sensor measurements, as at 202. The sensor measurements may include, for example, clamp pressure and/or applied torque. The method 200 may then compare the clamp pressure measured by the sensor with a predetermined clamp pressure setpoint, as at 204. For example, a difference between these two values may be determined. The applied clamp pressure, in comparison to the setpoint, may provide an indication as to whether the torque wrench is properly or "completely" gripping the tubular. If the torque wrench is not operating properly, e.g., caused by a hydraulic leak, hydraulic valve malfunction, or air in the hydraulic system, the clamp pressure may be lower than the clamp pressure setpoint by at least a certain percentage, e.g., about 10%, about 20%, or about 30% less than the predetermined setpoint.

Accordingly, in the illustrated embodiment, the method 200 may include determining whether the difference between the measured clamp pressure and the clamp pressure setpoint is greater than the certain percentage, (e.g., about 20% as shown), as at 206. If it is, the method 200 may end, as the clamp is not operating properly and thus an accurate reading of the wear on the dies may not be determined until the torque wrench is fixed. It will be appreciated that clamp pressure may not necessarily be associated with wear of the gripping members of the torque wrench, but low clamp pressure may result in the torque wrench slipping, and thus the situations (low clamp pressure versus wear on the gripping members) may be distinguished by first checking to ensure that clamp pressure is within range.

If the measured clamp pressure is within the certain percentage of the predetermined setpoint, the method 200 may recognize a proper clamp grip, as at 208. The method 200 may then enter the operational measurement phase, during which make-up and break-out operations are monitored. Starting with the make-up process, the method 200 may proceed to determining if make-up torque (as measured by a torque sensor of the torque wrench) is less than a predetermined minimum torque setpoint, as at 210. The minimum torque setpoint may be set by the manufacturer or by industry standards, e.g., for a particular type of pipe connection, and may represent a torque value for a successful connection. If the maximum torque value recorded during the make-up operation is less than the minimum setpoint, the method 200 may determine that slippage of the torque wrench (e.g., the die) on the tubular occurred, as at 212.

The break-out monitoring operation may be different from the make-up monitoring operations just described, as there may not be a predefined maximum break-out torque. Accordingly, slippage may be monitored, as at 214, e.g., directly by a rig operator, or via optical sensors, etc. When slippage is detected, it may be recorded manually by the rig operator, as at 210.

When slippage occurs, either during make-up or break-out, maintenance is called for and conducted as at 216. For example, the dies (or other gripping members) of the torque wrench may be replaced. Further, upon recognizing that slippage occurred at 212, the method 200 may include recording the slippage event (e.g., time) and transferring the slippage information to a predictive model, which will be described in greater detail below, as at 218.

Returning to blocks 210 and 214, if slippage is not detected (either in response to measured torque or visual inspection), the method 200 may proceed to assigning a pipe type to the connection that was just made or broken using the torque wrench, as at 220. For example, different types of pipes may have different sizes, different torque specifications, etc., which may lead to unequal wear for a given connection. Accordingly, when a connection is made or broken, it may be associated with the type of pipe that is now, or was, connected. For example, in the illustrated embodiment, three pipe types are contemplated, pipe type A, pipe type B, and pipe type C. However, this is merely an example and not to be considered limiting.

Accordingly, at blocks 222, 224, 226, in response to making or breaking the connection without slippage, a counter associated with the type of pipe is incremented. That is, if two pipes (tubulars) of type A are connected together, or disconnected, the result is that the counter for pipe type A is incremented, at 222. Continuing with the case, the counter for the other pipe types B and C would not be incremented. Likewise, if two pipes of type B are connected together or disconnected, the counter associated therewith may be incremented at 224, and if two pipes of type C are connected together or disconnected, the counter associated therewith may be incremented at 226.

Once slippage occurs, the counting may end, as the counters may generally record the number of connections of the individual pipe types made without slippage. Next, the values of these counters may be used to establish a predictive model. The predictive model may be configured to predict the number of connections for corresponding pipe type until slippage occurs, as at 228. The value of the counters may be passed after each connection is made/broken until slippage occurs or may be passed as a final count after slippage occurs. In either case, the model may be developed to predict a service life of the dies for the torque wrench based on the counter. In some embodiments, the model may be generated by counting the service life for multiple (dozens, hundreds, etc.) dies, such that counters are passed thereto multiple times.

In an example, the model may be a statistical model, which may generate, for example, a confidence range for a number of connections of different types of pipe that may be made or broken before failure (slippage). Such a statistical model might take into consideration values for the individual types of pipes, such that X number of connections of pipe type A and Y number of connections of pipe type B result in the end of the service life, but Z number of connections of pipe type A and Q number of connections of pipe type B result in the end of the service life, where A+B is not equal to Z+Q (e.g., because forming/breaking connections of pipe type B causes more wear than forming/breaking connections of pipe type A).

In another example, the predictive model may be a machine-learning model. The machine-learning model may employ the counters for the number of connections before slippage occurs as a training data set. Once trained, the machine-learning model may be able to predict the remaining service life for one or more dies for the torque wrench with a high level of confidence. It will be appreciated that any suitable type of machine-learning model could be used, such as a deep learning convolutional neural network, decision forest, etc.

The predictive model that is generated/trained using the data from the connections that are made/broken as part of the method 200 may be employed to schedule maintenance for dies used in subsequent make-up/break-out operations. For example, the dies may be scheduled to be replaced prior to when slippage is predicted to occur, and at a convenient time, such as when the rig is inoperative for other reasons (e.g., performing other maintenance, performing operations that do not use the torque wrench, etc.).

Figure 3:
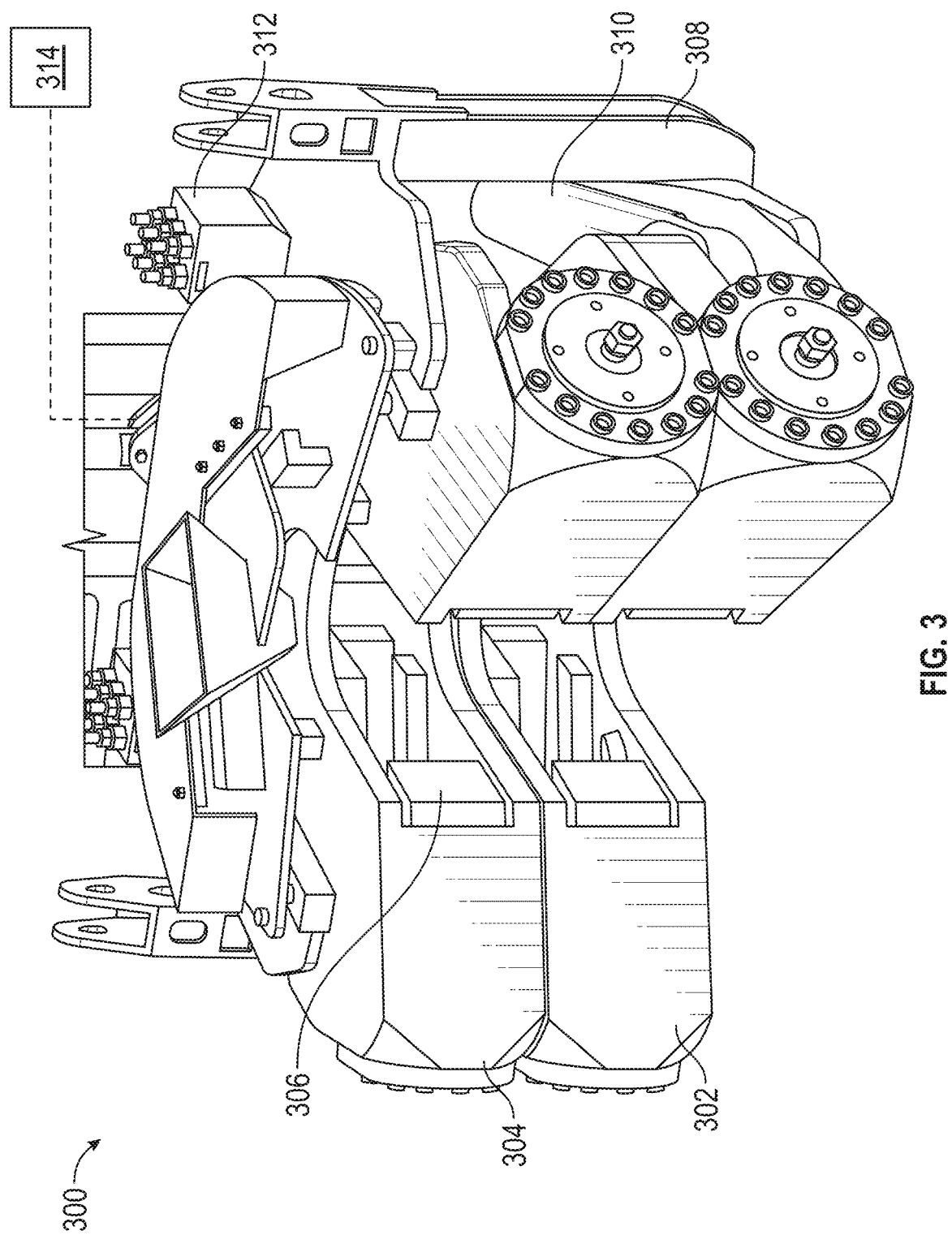
FIG. 3 illustrates a perspective view of a torque wrench, according to an embodiment.

FIG. 3 illustrates a perspective view of a torque wrench 300, according to an embodiment. In this embodiment, the torque wrench 300 may include a back-up tong 302 and a make-up tong 304. The back-up tong 302 and the make-up tong 304 may be axially offset (vertically) from one another, such that the back-up tong 302 is configured to grip a lower tubular while the make-up tong 304 is configured to grip an upper tubular. The make-up tong 304 may be rotatable relative to the back-up tong 302, so as to rotate the upper tubular into connection with the lower tubular, with the back-up tong 302 reacting torque to the lower tubular, which may be a string of tubulars that is restrained from rotation.

The back-up and make-up tongs 302, 304 may also include clamps 306. The clamps 306 may be movable, generally radially, so as to engage a tubular received laterally into a torque-wrench frame 308 that houses the tongs 302, 304. Torque cylinders 310 may be provided to transmit torque to the back-up tongs 302. The torque wrench 300 may also include flow dividers 312 for routing hydraulic fluid to the appropriate location during operation of the torque wrench 300.

As represented schematically in FIG. 3, the torque wrench 300 may also include one or more sensors 314. For example, the sensors 314 may include a torque sensor that measures the torque applied by one or both of the back-up tongs 302 and the make-up tongs 304 to the tubulars engaged thereby. The sensors 314 may also include a clamp pressure sensor that measures pressure applied by the clamps 306 to the tubulars.

Figure 4:
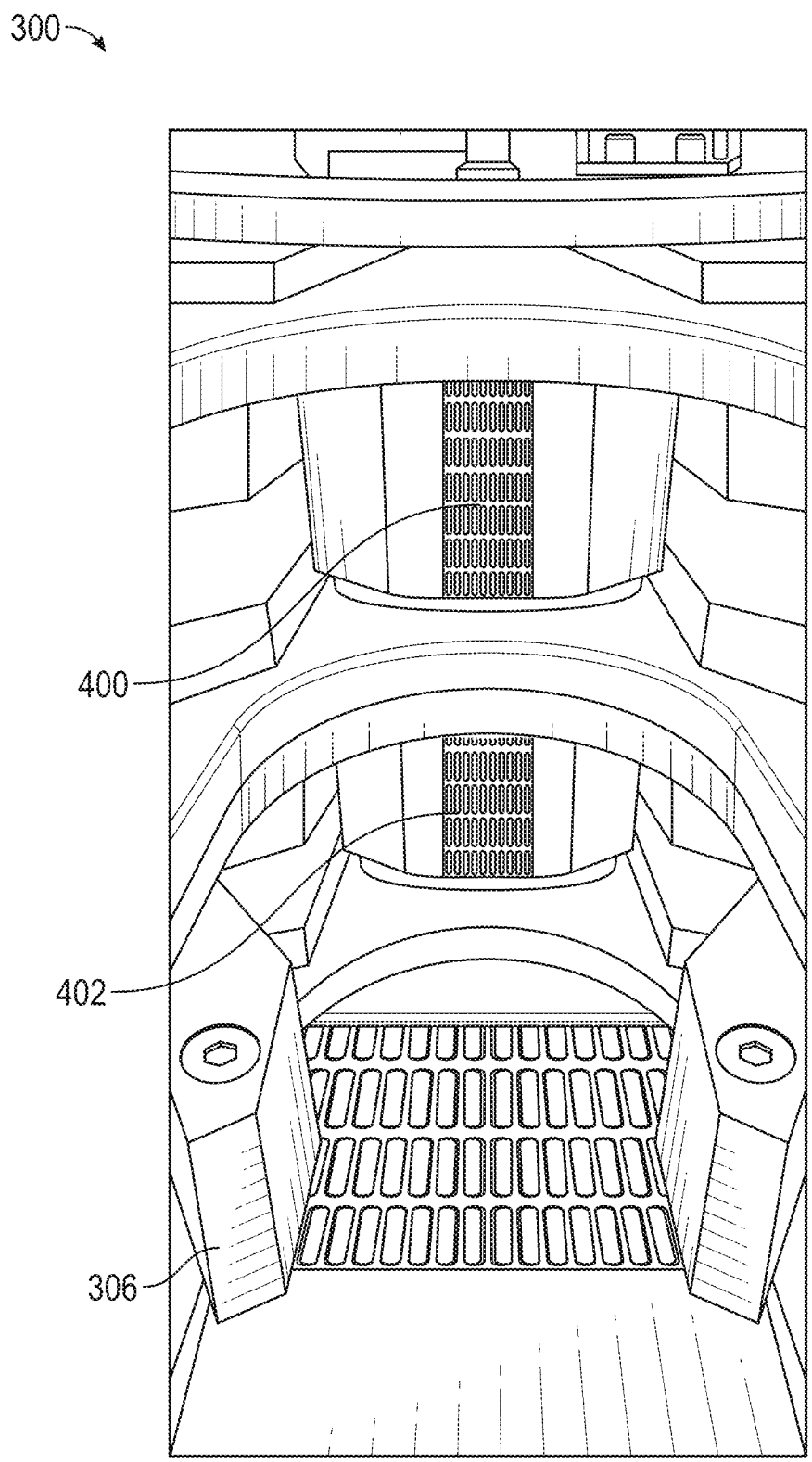
FIG. 4 illustrates another perspective view of the torque wrench, according to an embodiment.

FIG. 4 illustrates another perspective view of the torque wrench 300, according to an embodiment. As shown, the clamps 306 may be provided and move radially to receive and then engage a tubular. For example, the clamps 306 may press the tubular into engagement with a set of gripping members, e.g., dies 400, 402 (one set for each of the break-out and make-up tongs 302, 304). These gripping members may be consumable components of the torque wrench 300, and as described above, embodiments of the method 200 may be implemented to construct a model that predicts when the gripping members are likely to slip or otherwise fail due to wear, so that they can be replaced before then, e.g., at a convenient time.

Figure 5:
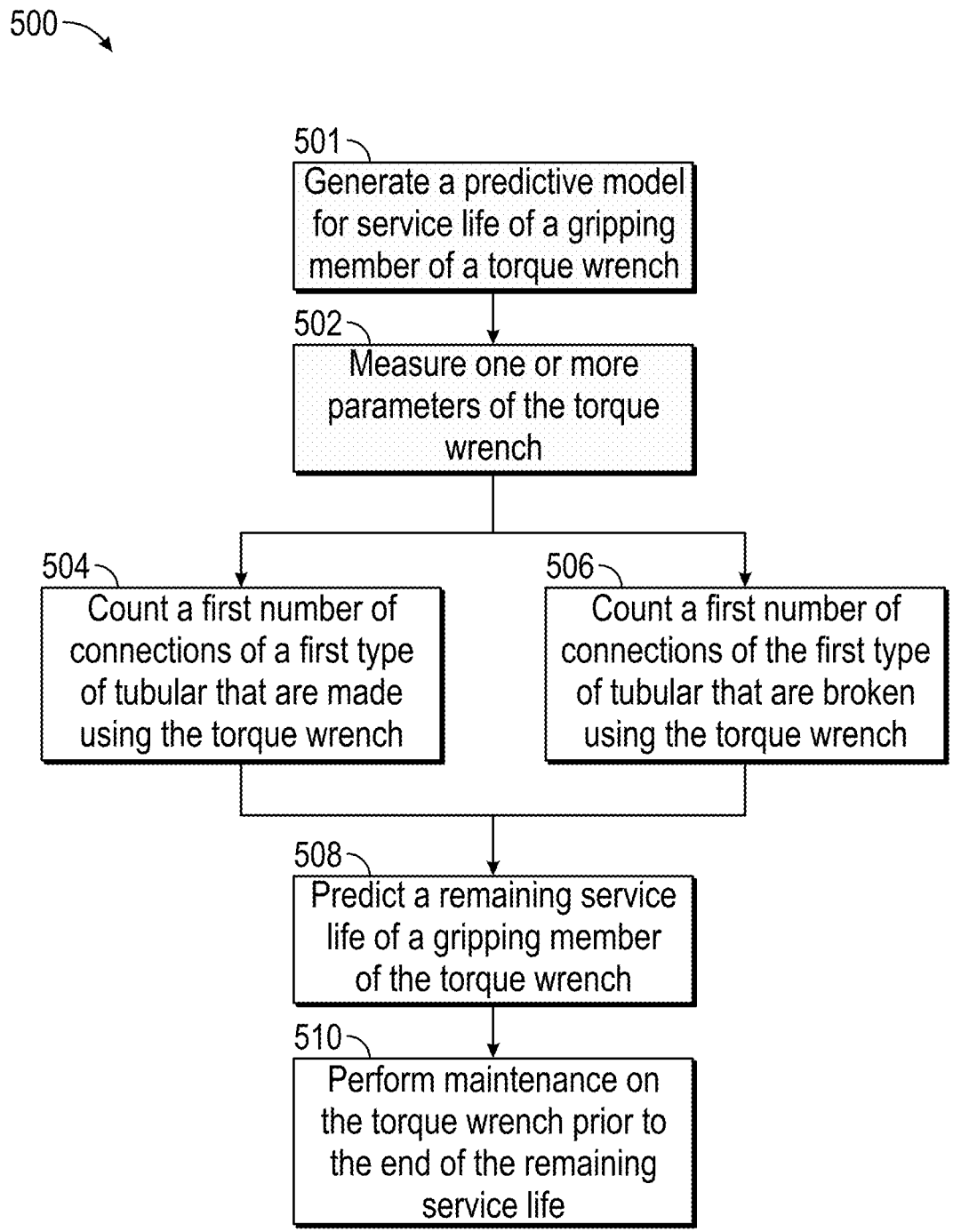
FIG. 5 illustrates a flowchart of a method for maintaining a torque wrench, according to an embodiment.

FIG. 5 illustrates a flowchart of a method 500 for maintaining a torque wrench, according to an embodiment. The method 500 may implement an embodiment of the method 200, and thus the methods 200, 500 should not be considered mutually exclusive. In an embodiment, the method 500 may be executed using an embodiment of the torque wrench 300 discussed above, but in other embodiments, a torque wrench component of a top drive, or any other torque wrench, may be used to execute at least a portion of the method 500.

The method 500 may include generating (e.g., receiving, constructing, or training), as in method 200, a predictive model for service life of a gripping member of a torque wrench, as at 501. The predictive model may be generated based on past experience with the torque wrench, or similar torque wrenches, and the number of connections of various pipe types that are made and/or broken before slippage occurs, as discussed above. As also discussed above, the predictive model may be a statistical model or a machine-learning model.

The method 500 may also include measuring one or more parameters of the torque wrench, at least during a make-up operation, as at 502. For example, the parameter being measured may include torque applied by the torque wrench to tubulars that are being connected together. The torque reaching at least a predetermined minimum may be indicative of a successful connection made using the torque wrench, e.g., without slippage. The two tubulars that are being connected may be of a first type, e.g., selected from a plurality of different types (e.g., sizes, thread types, application, etc.).

The method 500 may, in response, include counting a first number of connections of a first type of tubular that are made using a torque wrench, as at 504. In some embodiments, the method 500 may also include counting a first number of connections that are broken apart using the torque wrench, as at 506. For example, one or more counters may be instantiated and associated with connections of the first type of tubular, and that counter may be incremented each time tubulars of the first type are connected together or broken apart.

The method 500 may then include predicting a remaining service life of a gripping member of the torque wrench based in part on the first number of connections of the first type of tubular that were made and/or broken apart using the torque wrench, as at 508. For example, the method 500 may use the predictive model, and may feed the first number of connections of the first type, and the number of connections of any other pipe types made/broken since the gripping member was serviced, to predict a remaining service life, e.g., in terms of numbers of connections that can still be made/broken of various pipe types, with a high confidence.

In some embodiments, connections made or broken between different types of tubulars may be separately counted, as the wear induced by connecting or breaking apart one type of pipe may be different than the wear induced by connecting or breaking apart another type of pipe. The connections made/broken by the torque wrench of the different types may thus be employed to predict remaining service life.

The method 500 may then include performing maintenance on the torque wrench based on the remaining service life of the gripping member of the torque wrench that is predicted, before the torque wrench slips on a tubular while connecting the tubular to another tubular, as at 510. For example, the maintenance may be scheduled while the torque wrench is in use and prior to the end of the remaining service life, at a time that is convenient to drilling operations, e.g., when the drilling rig is otherwise inoperative, or the torque wrench is otherwise not in use.

In some embodiments, the method 500 may include, e.g., prior to counting the number of connections, measuring a clamping pressure applied by the torque wrench, and determining, based on the clamping pressure, whether an incomplete (or improper) grip is being used, e.g., that the clamping force is too low. In response, the method 500 may skip the blocks discussed above and may instead proceed to fixing the torque wrench, such that proper clamping is restored.

In one or more embodiments, the functions described can be implemented in hardware, software, firmware, or any combination thereof. For a software implementation, the techniques described herein can be implemented with modules (e.g., procedures, functions, subprograms, programs, routines, subroutines, modules, software packages, classes, and so on) that perform the functions described herein. A module can be coupled to another module or a hardware circuit by passing and/or receiving information, data, arguments, parameters, or memory contents. Information, arguments, parameters, data, or the like can be passed, forwarded, or transmitted using any suitable means including memory sharing, message passing, token passing, network transmission, and the like. The software codes can be stored in memory units and executed by processors. The memory unit can be implemented within the processor or external to the processor, in which case it can be communicatively coupled to the processor via various means as is known in the art.

Figure 6:
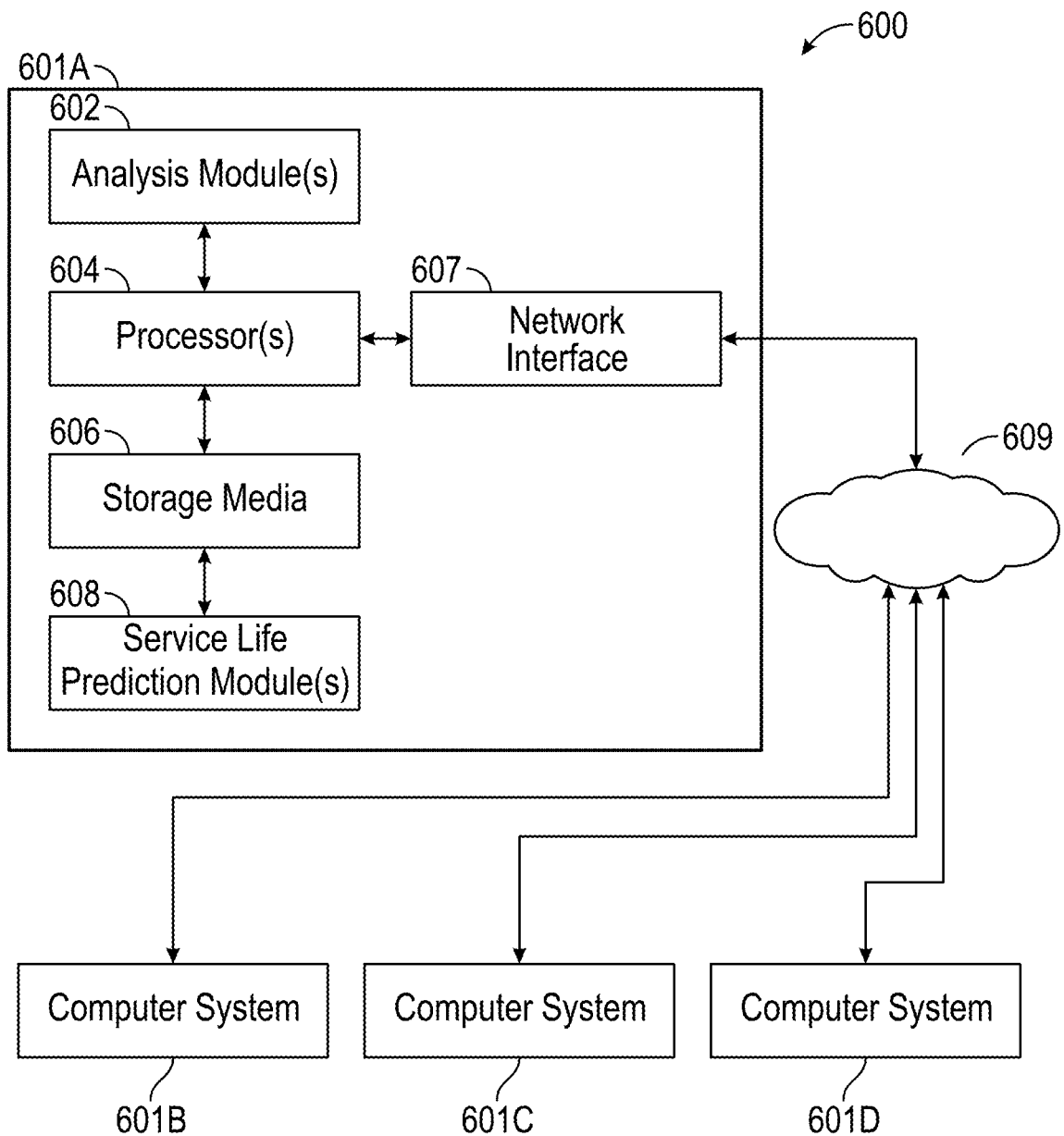
FIG. 6 illustrates a computing system for performing one or more aspects of the method, according to an embodiment.

In some embodiments, any of the methods of the present disclosure may be executed by a computing system. FIG. 6 illustrates an example of such a computing system 600, in accordance with some embodiments. The computing system 600 may include a computer or computer system 601A, which may be an individual computer system 601A or an arrangement of distributed computer systems. The computer system 601A includes one or more analysis module(s) 602 configured to perform various tasks according to some embodiments, such as one or more methods disclosed herein. To perform these various tasks, the analysis module 602 executes independently, or in coordination with, one or more processors 604, which is (or are) connected to one or more storage media 606. The processor(s) 604 is (or are) also connected to a network interface 607 to allow the computer system 601A to communicate over a data network 609 with one or more additional computer systems and/or computing systems, such as 601B, 601C, and/or 601D (note that computer systems 601B, 601C and/or 601D may or may not share the same architecture as computer system 601A, and may be located in different physical locations, e.g., computer systems 601A and 601B may be located in a processing facility, while in communication with one or more computer systems such as 601C and/or 601D that are located in one or more data centers, and/or located in varying countries on different continents).

A processor can include a microprocessor, microcontroller, processor module or subsystem, programmable integrated circuit, programmable gate array, or another control or computing device.

The storage media 606 can be implemented as one or more computer-readable or machine-readable storage media. Note that while in the example embodiment of FIG. 6 storage media 606 is depicted as within computer system 601A, in some embodiments, storage media 606 may be distributed within and/or across multiple internal and/or external enclosures of computing system 601A and/or additional computing systems. Storage media 606 may include one or more different forms of memory including semiconductor memory devices such as dynamic or static random access memories (DRAMs or SRAMs), erasable and programmable read-only memories (EPROMs), electrically erasable and programmable read-only memories (EEPROMs) and flash memories, magnetic disks such as fixed, floppy and removable disks, other magnetic media including tape, optical media such as compact disks (CDs) or digital video disks (DVDs), BLURRY® disks, or other types of optical storage, or other types of storage devices. Note that the instructions discussed above can be provided on one computer-readable or machine-readable storage medium, or alternatively, can be provided on multiple computer-readable or machine-readable storage media distributed in a large system having possibly plural nodes. Such computer-readable or machine-readable storage medium or media is (are) considered to be part of an article (or article of manufacture). An article or article of manufacture can refer to any manufactured single component or multiple components. The storage medium or media can be located either in the machine running the machine-readable instructions, or located at a remote site from which machine-readable instructions can be downloaded over a network for execution.

In some embodiments, computing system 600 contains one or more service life prediction module(s) 608. In the example of computing system 600, computer system 601A includes the service life prediction module 608. In some embodiments, a single service life prediction module may be used to perform some or all aspects of one or more embodiments of the methods. In alternate embodiments, a plurality of service life prediction modules may be used to perform some or all aspects of methods.

It should be appreciated that computing system 600 is only one example of a computing system, and that computing system 600 may have more or fewer components than shown, may combine additional components not depicted in the example embodiment of FIG. 6, and/or computing system 600 may have a different configuration or arrangement of the components depicted in FIG. 6. The various components shown in FIG. 6 may be implemented in hardware, software, or a combination of both hardware and software, including one or more signal processing and/or application specific integrated circuits.

Further, the steps in the processing methods described herein may be implemented by running one or more functional modules in information processing apparatus such as general purpose processors or application specific chips, such as ASICs, FPGAs, PLDs, or other appropriate devices. These modules, combinations of these modules, and/or their combination with general hardware are all included within the scope of protection of the invention.

Data interpretation processes may be refined in an iterative fashion; this concept is applicable to embodiments of the present methods discussed herein. This can include use of feedback loops executed on an algorithmic basis, such as at a computing device (e.g., computing system 600, FIG. 6), and/or through manual control by a user who may make determinations regarding whether a given step, action, template, model, or set of curves has become sufficiently accurate for the evaluation of the subsurface three-dimensional geologic formation under consideration.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. Moreover, the order in which the elements of the methods are illustrated and described may be re-arranged, and/or two or more elements may occur simultaneously. The embodiments were chosen and described in order to best explain the principles of the invention and its practical applications, to thereby enable others skilled in the art to best utilize the invention and various embodiments with various modifications as are suited to the particular use contemplated.

What is claimed is:

1. A method comprising:
generating a model for predicting a remaining service life of a gripping member of a torque wrench based in part on a number of connections of one or more types of tubulars that are made or broken using the torque wrench before slippage of the torque wrench occurs;
using a processor, counting a first number of connections of a first type of tubular that are made using the torque wrench;
predicting, using the processor and the model, the remaining service life of the gripping member of the torque wrench based in part on the first number of connections of the first type of tubular that were made using the torque wrench; and
using the processor, scheduling maintenance on the torque wrench based on the remaining service life of the gripping member of the torque wrench that is predicted, before slippage of the torque wrench occurs,
wherein generating the model comprises:
receiving a sensor-based measurement of a clamping pressure applied by the torque wrench onto a tubular and a sensor-based measurement of a torque applied by the torque wrench on the tubular while connecting the tubular to another tubular; and
determining that the clamping pressure is within a certain percentage of a clamp pressure setpoint and that the torque indicates that the torque wrench did not slip on the tubular before counting a connection between the tubular and the other tubular such that each of the number of connections is representative of torque wrench wear and not a clamping pressure generation issue of a clamping system of the torque wrench.

2. The method of claim 1, comprising counting, using the processor, an additional first number of connections of the first type of tubular that are disconnected using the torque wrench, wherein the predicting is further based in part on the additional first number of connections of the first type of tubular that are disconnected using the torque wrench.

3. The method of claim 1, comprising counting, using the processor, a second number of connections of a second type of tubular that are made using the torque wrench, wherein the predicting comprises using the processor and the model to predict the remaining service life based on a combination of the first number of connections and the second number of connections.

4. The method of claim 1, wherein the gripping member comprises a die configured to engage the types of tubulars.

5. The method of claim 4, comprising scheduling maintenance that comprises scheduling replacement of the die.

6. The method of claim 1, comprising scheduling maintenance that comprises scheduling maintenance for when a drilling rig, including the torque wrench, is inoperative, for when the torque wrench is not in use, or for when the drilling rig is inoperative and for when the torque wrench is not in use.

7. The method of claim 1, wherein the model comprises a machine-learning model, and wherein generating the model comprises training the machine-learning model to predict the remaining service life of the gripping member.

8. The method of claim 7, comprising counting, using the processor, a second number of connections of a second type of tubular that are made using the torque wrench, wherein the predicting the remaining service life comprises using the machine-learning model to predict the remaining service life based on a combination of the first number of connections and the second number of connections.

9. The method of claim 7, wherein training the machine-learning model comprises:
receiving a signal indicative of a torque applied to a tubular of the types of tubulars by the torque wrench while connecting the tubular to another tubular using the torque wrench;
determining that the torque wrench slipped on the tubular based on the torque; and
in response to determining the torque wrench slipped on the tubular, recording a slippage event that indicates an occurrence of slippage of the torque wrench.

10. The method of claim 1, wherein the clamping system comprises a hydraulic clamping system.

11. The method of claim 10, comprising scheduling servicing of the clamping system that comprises one or more of fixing a hydraulic leak in the hydraulic clamping system, fixing a hydraulic valve malfunction in the hydraulic clamping system, and removing air in the hydraulic clamping system.

12. The method of claim 1, wherein the certain percentage is 10 percent less than the clamp pressure setpoint.

13. The method of claim 1, wherein the certain percentage is 20 percent less than the clamp pressure setpoint.

14. The method of claim 1, wherein the certain percentage is 30 percent less than the clamp pressure setpoint.

15. A computer system, comprising:
one or more processors; and
a non-transitory computer-readable medium storing instructions that, when executed by at least one of the one or more processors, is configured to cause the computer system to perform operations, the operations comprising:
generating a model for predicting a remaining service life of a gripping member of a torque wrench based in part on a number of connections of one or more types of tubulars that are made or broken using the torque wrench before slippage of the torque wrench occurs;
counting a first number of connections of a first type of tubular that are made using the torque wrench;
predicting, using the model, the remaining service life of the gripping member of the torque wrench based in part on the first number of connections of the first type of tubular that were made using the torque wrench; and
scheduling maintenance on the torque wrench based on the remaining service life of the gripping member of the torque wrench that is predicted, before slippage of the torque wrench occurs,
wherein generating the model comprises:
receiving a sensor-based measurement of a clamping pressure applied by the torque wrench onto a tubular and a sensor-based measurement of a torque applied by the torque wrench on the tubular while connecting the tubular to another tubular; and
determining that the clamping pressure is within a certain percentage of a clamp pressure setpoint and that the torque indicates that the torque wrench did not slip on the tubular before counting a connection between the tubular and the other tubular
such that each of the number of connections is representative of torque wrench wear and not a clamping pressure generation issue of a clamping system of the torque wrench.

16. The system of claim 15, wherein the gripping member comprises a die configured to engage the types of tubulars and comprising scheduling maintenance that comprises scheduling replacement of the die.

17. The system of claim 15, comprising scheduling maintenance that comprises scheduling maintenance for when a drilling rig, including the torque wrench, is inoperative, for when the torque wrench is not in use, or for when the drilling rig is inoperative and for when the torque wrench is not in use.

18. The system of claim 15, wherein the model comprises a machine-learning model, and wherein generating the model comprises training the machine-learning model to predict the remaining service life of the gripping member.

* * * * *